H. P. Gregory
Spinning Machine.
No. 93,709. Patented Aug. 17, 1869.
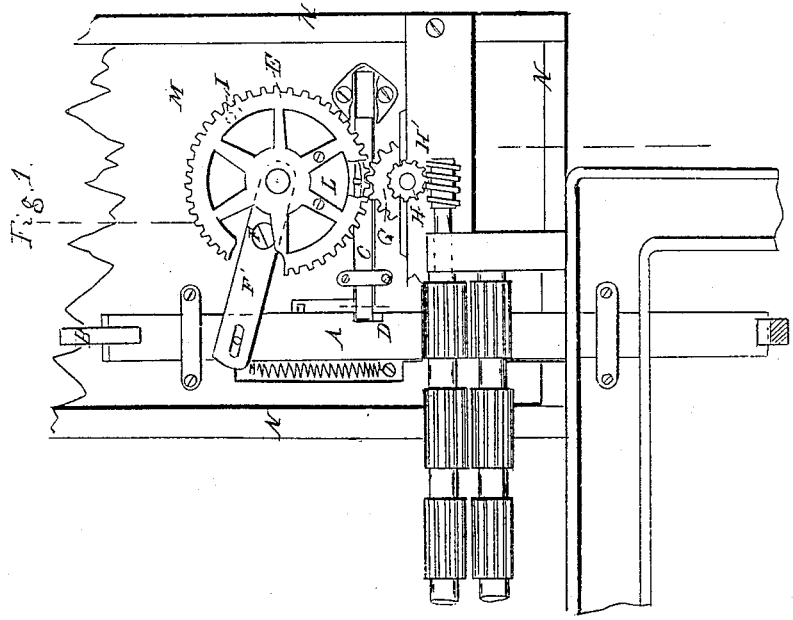
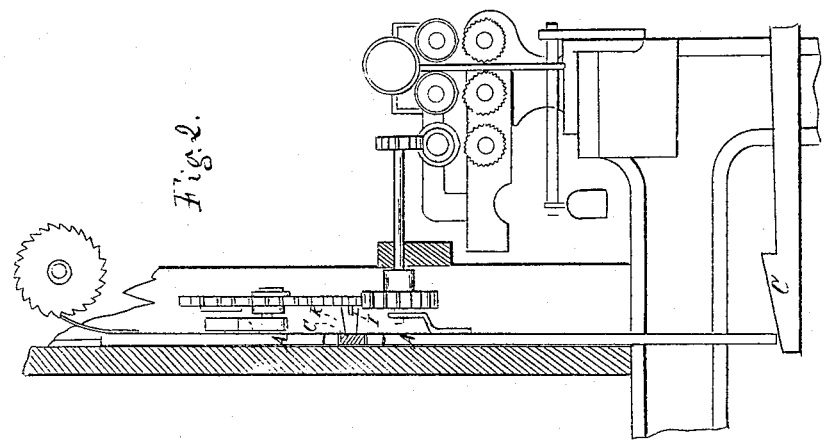
Witnesses
Chas Nida
Alex J. Roberts
Inventor
H. P. Gregory
per
[signature]
Attorneys

United States Patent Office.

HENRY P. GREGORY, OF PLATTSBURG, NEW YORK.

Letters Patent No. 93,709, dated August 17, 1869.

IMPROVEMENT IN REGISTERING-APPARATUS FOR SPINNING-MULES.

The Schedule referred to in these Letters Patent and making part of the same.

*To all whom it may concern:*

Be it known that I, HENRY P. GREGORY, of Plattsburg, in the county of Clinton, and State of New York, have invented a new and improved Registering-Apparatus for Spinning-Jacks; and I do hereby declare that the following is a full, clear, and exact description thereof, which will enable others skilled in the art to make and use the same, reference being had to the accompanying drawing, forming part of this specification.

This invention relates to improvements in registering-apparatus for spinning-jacks, and other spinning-machinery, the object of which is to so arrange them that dishonest operatives may be prevented from working them to make them register more than they would do by the legitimate operation of the machines to which they are attached.

In the accompanying drawings—

Figure 1 represents a front elevation of the operating-mechanism as arranged according to my improvement.

Figure 2 represents a side elevation of the same.

Similar letters of reference indicate corresponding parts.

A represents a sliding bar, provided with a spring-pawl, B, for operating the ratchet-wheel, for moving the pointer over the dial, which, being of common construction, are not represented in the drawing.

The said bar is suitably arranged at its lower end with reference to the carriage, or an inclined plane, C, thereon, or any other suitable mechanism to be raised by the same, at the moment that the said carriage arrives at the end of its inner movement, to cause, by its action on the ratchet, a movement to register the corresponding movement of the carriage, or the work done during one full movement of the carriage.

To prevent the said sliding bar from immediately falling back, or as soon as the arm C is withdrawn from it, by the commencement of the return movement of the carriage, which would admit of its being moved several times, by hand, during the next spinning, and winding-on movement, a sliding catch-bar, c, is arranged in suitable grooves or ways in the casing enclosing the apparatus, preferably at right angles to the bar A, and provided with a spring, which causes it to enter the notch D, arranged in the bar A, at the right point to hold the bar in the elevated position until, or very nearly until the cessation of the movement of the rollers, when the said sliding catch-bar is withdrawn, and the bar A allowed to fall.

The withdrawal of the bar c is effected in the following manner:

The gear-wheel E is journalled in the end of the short arm of a lever, F', pivoted at F, and connected at its long arm to the slide-bar A, in such a manner that when the bar rises, it will cause the said wheel E to gear with a wheel, G, on a shaft connected, by the worm-gears H H', with the rollers of the spinning-machine, whereby it will be set into slow rotary motion by the said rollers, when they are geared with the moving power at the commencement of the outward movement of the carriage.

The said wheel E is provided with a pin, I, which, at the proper moment, strikes a projection, K, on the sliding catch-bar C, and withdraws it from the notch in the bar A, allowing it to fall, and the falling movement of the said bar raises the wheel E out of gear with the wheel G, which is returned to the right point, by a weight, L, to gear with the wheel G at the next movement, so that the spinning-mechanism may run the desired length of time before the said bar A falls.

The advantage of gearing the releasing-apparatus with the rollers is, that the latter cannot be moved by the operator without seriously interfering with the proper working of the machine, and thereby leading to his detection.

The said apparatus may, however, with like results, be geared to the drum-shaft, but in this case it would be necessary to substitute bevel-wheels for the worm-gears, the motion of the said drum being very slow.

I propose to arrange the said mechanism in a closed case, made of metal, or other material, together with the dial and the mechanism actuated by the pawl B for moving the pointer, of which case, M represents the back, and N, the two side and bottom end walls, and the front I propose to cover with a glass covering to admit of a ready inspection of the apparatus, and as a convenient arrangement, I propose to attach it upon the front of the head of the spinning-frame facing the operator.

The notch D in the bar A is made materially greater in length than the width of the bar c, so that the said bar A must be raised considerably higher than is required for the bar c to fall into the said notch, to cause the register to move; otherwise the projecting lower end of the bar would afford a means of raising it sufficiently high to move the registering-apparatus, without allowing the bar C to fall into the notch.

Having thus described my invention,

I claim as new, and desire to secure by Letters Patent—

1. The combination of the wheel E and pivoted lever F', with the gear-wheel G, gearing H H', and the drawing-rollers or drum-shaft, substantially as described, for the purpose specified.

2. The combination of the bar A, sliding catch-bar c, pivoted lever F', weight L, and pin I, with the wheel E, for gearing and ungearing with the rollers, substantially as herein shown and described.

3. The combination, with the bar A, sliding catch-bar c, the wheel G, and the gearing H H', of the weighted wheel E and lever F', substantially as and for the purpose specified.

The above specification of my invention signed by me, this 24th day of November, 1868.

HENRY P. GREGORY.

Witnesses:
  FRANK BLOCKLEY,
  E. GREENE COLLINS.